3,261,836
PROCESS FOR PRODUCING LINEAR QUINACRIDONES

Chung C. Chen, Belleville, N.J., assignor to E. I. du Pont de Nemours and Company, Wilmington, Del., a corporation of Delaware
No Drawing. Filed Oct. 15, 1962, Ser. No. 230,707
4 Claims. (Cl. 260—279)

This application is a continuation-in-part of my prior copending application Serial No. 50,073, filed August 17, 1960, and now abandoned.

This invention relates to a new process for producing linear quinacridones, said process comprising heating a 2,5-diarylamino-terephthalic acid compound in a cyclizing agent consisting of concentrated sulfuric acid or a benzene sulfonic acid.

Quinacridone is a known compound which is useful as a red pigment. This compound may also be correctly named quin-(2,3-b)-acridine-7,14(5,12)-dione, and it has the following structural formula:

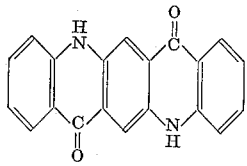

Halogen-substituted, alkyl-substituted, and alkoxy-substituted quinacridones are also known. Such compounds have been prepared by heating a dialkyl 2,5-diarylamino-3,6-dihydro terephthalate derivative such as diethyl 2,5-dianilino-3,6-dihydro terephthalate in an inert, high-boiling liquid, such as eutectic mixture of biphenyl and diphenyl oxide to produce dihydroquinacridones. This reaction may be illustrated by the following equation:

EQUATION 1

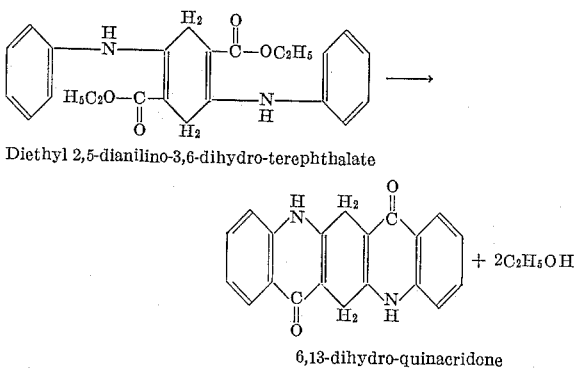

Diethyl 2,5-dianilino-3,6-dihydro-terephthalate 6,13-dihydro-quinacridone

The dihydro derivatives obtained according to Equation 1 can then be subjected to oxidation whereby two hydrogen atoms are removed and quinacridone is obtained in accordance with Equation 2 below:

EQUATION 2

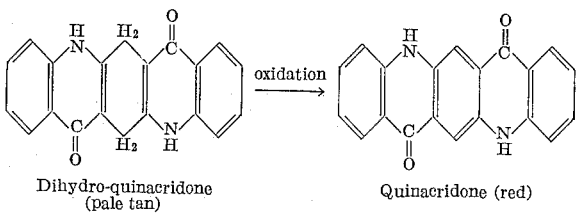

Dihydro-quinacridone (pale tan)　　　Quinacridone (red)

These reactions provide a highly successful and practical means for the production of quinacridone, and they are more fully described in U.S. Patent 2,821,529.

Alternative processes for the production of quinacridone are described by Liebermann in Annalen 518, p. 245 (1935). This publication discloses that dianilinoterephthalic acid can be cyclized to quinacridone by heating the terephthalic acid in a relatively larger amount of boric acid, at temperatures in the range of 320° C.–330° C. Liebermann et al. also disclose that quinacridone can be prepared by heating dianilinoterephthalic acid with $P_2O_5$ in suspension in cymol. The Liebermann et al. publication also suggests that quinacridone has been prepared by reaction of the dianilinoterephthalic acid with HBr and also with a mixture of $PCl_5$ and $AlCl_3$.

It is an object of this invention to provide a new and convenient process for the preparation of quinacridones by the cyclization of terephthalic acid derivatives, such as the diarylaminoterephthalic acids, their alkyl esters, and the alkyl esters of diarylaminodihydro terephthalate. This process is accomplished by heating a 2,5-diarylaminoterephthalic acid compound of the formula

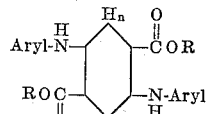

where R is selected from the group consisting of hydrogen and alkyl groups, $n$ is an integer of from 1 to 2, and the aryl group is selected from the group consisting of phenyl, naphthyl, halogen-substituted phenyl, halogen-substituted naphthyl, alkyl-substituted phenyl and alkyl-substituted naphthyl radicals wherein said alkyl substituents contain up to 3 carbons, said substituted radicals having at least one unsubstituted carbon ortho to the amino group. The heating of the above-described terephthalic acid derivative is conducted in the cyclizing medium selected from the group consisting of sulfuric acid of at least 55% concentration, fuming sulfuric acid, benzene sulfonic acid, and benzene sulfonic acids which are substituted on the benzene ring with radicals selected from the group consisting of methyl, fluoro, chloro, bromo, iodo, and combinations thereof. In instances where a benzene sulfonic acid is the cyclizing medium, the acid per se may be employed, or, if desired, the acid may be diluted with an inert high-boiling organic liquid such as trichlorobenzene or ortho-dichlorobenzene. It has been found that solutions containing greater than about 1% sulfonic acid are suitable. The heating in the cyclizing medium causes the diarylaminoterephthalic acid compound to cyclize to the quinacridone structure by simultaneous ring closures involving each of the —COOR groups on the central ring. When $n$ is 2 in the above formula, the compound is a dihydroterephthalate, and in order to accomplish the cyclization, fuming sulfuric acid is required. Moreover, in the cyclization of the dihydroterephthalic acid derivative, there is a simultaneous oxidation so that quinacridone rather than a dihydroquinacridone is produced. In instances where the cyclizing medium is benzenesulfonic acid or a substituted benzenesulfonic acid, the diarylaminoterephthalic acid compound is directly converted to quinacridone. However, when sulfuric acid of at least 55% concentration or fuming sulfuric acid is used, quinacridone sulfonic acid is produced. If this is the desired end product, it may be precipitated from the sulfuric acid cyclizing medium by diluting the latter with water to acid concentrations in the range 55–80%. Solubility of quinacridone sulfuric acid becomes objectionably large at low acid concentrations.) The precipitate thus formed can then be recovered by conventional means such as filtering, decantation, etc. On the other hand, if the desired end product is quinacridone, a desulfonation process must be carried out. This desulfonation process is accomplished simply by heating at temperatures above 100° C., and preferably at least 200° C., the quinacridone sulfonic acid in sulfuric acid of 1–50% concentration under pressure. The most convenient procedure for the desulfonation is to heat the quinacridone sulfonic acid in a closed reaction vessel under autogenous pressure. It has been found that if the desulfonation is carried out in a sulfuric acid of 20%–30% concentration, the quinacridone end product is predominantly in the beta crystal phase. On the other hand, if the sulfuric acid concentration is 40%–45%, the quinacridone end product is predominantly in the gamma crystal phase. An alternative procedure for producing gamma phase quinacridone during desulfonation when using sulfuric acid of 20%–30% concentration is to introduce seed crystals of gamma phase quinacridone into the reaction vessel.

In a preferred procedure of this invention, one part of 2,5-dianilino-terephthalic acid is dissolved in about 12 parts of concentrated sulfuric acid and the solution is heated gradually to about 150° C. and maintained at that temperature for about 15 minutes, after which it is cooled, sufficient water is added to dilute the acid to a concentration of about 45% and the diluted mixture is then heated in a closed pressure vessel at 300° C. for about 7 hours. The resulting quinacridone is isolated by filtration, washed first with water, then with a dilute solution of alkali, and again with water until free of soluble salts and alkali, and finally dried to give a crude product in substantially quantitative yield.

In an alternative procedure, one part of diethyl-2,5-dianilino-3,6-dihydro terephthalate is added to about 8 parts of 30% oleum (fuming sulfuric acid containing 30% free $SO_3$) at room temperature and the temperature is allowed to rise as the result of a spontaneous exothermic reaction to about 120° C. and the mixture is stirred at that temperature for about 15 minutes, after which it is cooled and sufficient water added to reduce the acid concentration to about 30% $H_2SO_4$. The mixture is then charged to a pressure vessel which is sealed and heated at 300° C. for about 6 hours, following which the quinacridone is isolated in substantially the same manner as noted above. As a modification of this second process, the sulfonated quinacridone may be isolated by salting it out with sodium chloride, following the reaction with oleum and dilution. The product thus obtained is filtered off and washed with saturated sodium chloride solution, and the moist filter cake is heated under pressure in a bomb, or other pressure vessel, with about 12 parts of 30% sulfuric acid solution at 300° C. for 6 hours, and is then isolated and finished as described above.

In another modification of the invention, a mixture of 1 part of 2,5-dianilino-terephthalic acid with 3 parts of para-toluene sulfonic acid monohydrate is heated to 140° C. and maintained at about that temperature for 1½ hours. The mixture is then poured into a dilute aqueous solution of sodium hydroxide and the resulting precipitate is isolated by filtration, washing with water and drying. A quinacridone yield of approximately 80% of theoretical is obtained.

A solution of para-toluene sulfonic acid in trichlorobenzene or in orthodichlorobenzene can also be used for the cyclization. For example, one part of 2,5-dianilino-terephthalic acid is added to 15 parts of a 2% solution of para-toluene sulfonic acid in trichlorobenzene, and the mixture is heated to the boil and refluxed for 3 hours, after which the quinacridone is isolated by filtration and the precipitate is washed successively with alcohol, water, aqueous sodium hydroxide and finally with water again to freedom from alkali. After drying, a yield of quinacridone corresponding to 75% of the theoretical is obtained. When benzene sulfonic acids, such as para-toluene sulfonic acid, are used for the ring closure, a desulfonation step is unnecessary since no sulfonation occurs.

Control of the crystal phase of the quinacridone product may be effected by suitably adjusting the sulfuric acid concentration used in the desulfonation step, or by seeding with the gamma crystal phase quinacridone at the start of the desulfonation step, or by a combination of these two methods. For example, one part of 2,5-dianilino-terephthalic acid is cyclized and sulfonated to quinacridone sulfonic acid by heating at 150° C. for 15 minutes with 12 parts of concentrated sulfuric acid. The quinacridone sulfonic acid can then be desulfonated to a gamma phase quinacridone by cooling and diluting the sulfonic acid solution to a final sulfuric acid concentration of 45%, heating the diluted mixture in a sealed pressure vessel at 300° C. for 7 hours, then isolating the quinacridone by filtration, washing with water, washing with aqueous sodium hydroxide solution, and finally washing again with water to freedom from alkali, and drying the washed product. The quinacridone product obtained in this way exhibits predominantly the gamma phase X-ray diffraction pattern. If the concentration of the sulfuric acid is diluted to 25%, following the cyclization step, and the mixture is then heated in a sealed pressure vessel and processed as described above, the quinacridone product is substantially all in the beta phase. If, however, in a process as described above, one part of a pigmentary gama phase quinacridone is added to the quinacridone sulfonic acid-sulfuric acid mixture after addition of water to reduce the acid concentration to 25% $H_2SO_4$, the quinacridone product obtained after heating for 7 hours at 300° C. is substantially all gamma crystal phase quinacridone.

For a clearer understanding of the invention, the following specific examples are given. These examples are intended to be merely illustrative of the invention, and not in limitation thereof. Unless otherwise specified, all parts are by weight.

Example I 15 parts of 2,5-dianilino-terephthalic acid is dissolved in 180 parts of concentrated (96%) sulfuric acid and the solution is heated with stirring to 150° C. during approximately 30 minutes. The solution is held at 150° C. for 15 minutes with stirring and then cooled to room temperature. 210 parts of water is then added slowly with stirring to reduce the sulfuric acid concentration to approximately 45%. The diluted mixture is heated in a sealed thick-walled glass tube at 300° C. for 7 hours and then allowed to cool to room temperature. The tube is opened and the contents are washed into approximately 1000 parts of water and the resulting slurry filtered. The precipitate is washed with water, then with dilute sodium hydroxide solution, and finally washed alkali-free with water. On drying, a yield of 13.5 parts of quinacridone is obtained as a red powder exhibiting, on X-ray examination, predominantly the diffraction pattern characteristic of the gamma phase as given in U.S. 2,844,581, with only a trace of the pattern of the beta phase as given in U.S. 2,844,485. The yield is essentially quantitative.

Example II 15 parts of 2,5-dianilino-telephthalic acid is dissolved in 180 parts of concentrated (96%) sulfuric acid and the solution is then heated slowly to 150° C. with stirring, and held at 150° C. for 15 minutes. The solution is allowed to cool to room temperature and 520 parts of water is added to dilute the sulfuric acid concentration to approximately 25%. The diluted mixture is then sealed into a heavy-walled glass tube and heated to 300° C. and maintained at that temperature for approximately 7 hours, after which it is allowed to cool to room temperature.

The mixture is then diluted with approximately 1000 parts of water and filtered. The precipitate is washed substantially free of acid with water, then washed with a dilute solution of sodium hydroxide to neutralize any residual acid and finally washed with water until substantially free of alkali. The filter cake is dried at about 60–70° C. to give 13.5 parts of a bluish red quinacridone pigment with an X-ray diffraction pattern characteristic of the beta phase of quinacridone with only a trace of the diffraction pattern of the gamma phase.

Example III 15 parts of dianilino-terephthalic acid is dissolved in 180 parts of concentrated (96%) sulfuric acid and the solution is then heated with stirring to approximately 150° C. and maintained at that temperature for 15 minutes. The mixture is allowed to cool to room temperature and is then added to a previously prepared slurry of 3.5 parts of the pigmentary gamma phase quinacridone product of Example I in 510 parts of water. The quantity of water in the slurry to which the acidic mixture is added is sufficient to reduce the sulfuric acid concentration to approximately 25%. The diluted slurry is sealed into a glass-lined pressure vessel which is then heated to 300° C. in approximately 1½ hours and maintained at that temperature for approximately 7 hours, after which it is allowed to cool to room temperature. The contents of the pressure vessel are then added to approximately 1000 parts of water, after which the insoluble precipitate is filtered from the acidic mother liquor, washed substantially free of acid with water, then washed with a dilute solution of sodium hydroxide to neutralize any residual acid and finally washed again with water until it is substantially free of alkali. The filter cake is dried at a temperature of about 60–70° C. to give essentially a quantitative yield of bright red quinacridone pigment. On X-ray examination, the product exhibits predominantly the diffraction pattern charaeteristic of the gamma phase of quinacridone with only a trace of the pattern characteristic of the beta phase. This is in contrast to the predominantly beta phase product obtained in Example II which was carried out under substantially identical conditions except for the absence of the gamma phase quinacridone seed.

It will be noted that the seed material used in this Example was a product of Example I. Another material which is especially effective as a phase director is small-particle-size pigmentary gamma phase quinacridone prepared by milling in accordance with the method described in U.S. Patent 2,844,581, then filtering and washing the milled pigment to remove the grinding agent, and slurrying the washed press cake in water by stirring.

Example IV

A mixture of 15 parts of 2,5-dianilino-terephthalic acid with 45 parts of para-toluene sulfonic acid mono-hydrate is heated with stirring to 145° C. during approximately an hour and maintained at 145–150° C. for 1½ hours. The mixture is agitated vigorously throughout the heating to avoid excessive localized temperature. After the heating, the mixture is cooled, then poured into a dilute aqueous solution of sodium hydroxide and the highly colored insoluble precipitate is filtered from the alkaline mother liquid, washed free of alkali with water and dried at a temperature of about 60–70° C. 10.9 parts of quinacridone is obtained which, upon X-ray examination, exhibits the diffraction pattern characteristic of the gamma crystal phase. This corresponds to a yield of approximately 80% of theory.

It should be noted that no desulfonation step is required in this example since the cyclization was carried out in a benzene sulfonic acid.

Example V 3 parts of para-toluene sulfonic acid mono-hydrate is dissolved in 160 parts of 1,2,4-trichlorobenzene heated at 100° C. 10 parts of 2,5-dianilino-terephthalic acid is added to the solution and the mixture is then heated to approximately 210° C. and maintained under reflux at approximately that temperature for 3 hours. The mixture is then filtered hot to isolate the colored precipitate from the slurry and the precipitate is washed first with alcohol, then with water, then with dilute aqueous sodium hydroxide solution and finally washed again with water to freedom from alkali. The washed presscake is dried at about 60–70° C. to give 6.6 parts of red quinacridone pigment. Examination of the dry product by X-ray diffraction shows it to have the X-ray diffraction pattern characteristic of gamma phase quinacridone. The yield corresponds to approximately 74% of the theoretical.

Example VI 130 parts or orthodichlorobenzene is heated to 100° C. and 3 parts of para-toluene sulfonic acid mono-hydrate is added gradually with stirring and stirred to solution. 10 parts of 2,5-dianilino-terephthalic acid is then added and the mixture heated to boiling, approximately 180° C., and maintained at that temperature under reflux for approximately 3 hours. The highly colored insoluble precipitate is then separated by filtering the mixture hot, and the precipitate is washed successively with alcohol, water, aqueous sodium hydroxide solution, and finally again with water. The washed filter cake is dried at about 60–70° C. to give a yield of approximately 3.8 parts of bright red gamma phase quinacridone pigment. This corresponds to a yield of approximately 43% of the theoretical based on the quantity of dianilino-terephthalic acid used.

Example VII 15 parts of diethyl-2,5-dianilino-dihydro terephthalate is added to 110 parts of 30% oleum (fuming sulfuric acid containing 30% free $SO_3$) at room temperature with vigorous stirring. The temperature of the mixture rises rapidly as a result of an exothermic reaction and reaches approximately 120° C. The color of this solution changes from brown to green and then to red. The solution is agitated vigorously for 15 minutes, without cooling, after which it is cooled in an ice bath and diluted with 50 parts of water added slowly with vigorous stirring. A red precipitate forms which is separated from the mother liquid by filtration and the precipitate is then washed with approximately 100 parts of 80% sulfuric acid. A violet colored quinacridone sulfonic acid is obtained which is desulfonated by heating with diluted sulfuric acid as follows: The washed precipitate is mixed with 120 parts of 30% sulfuric acid solution and the mixture is sealed into a heavy-walled glass tube which is then heated to 300° C. during approximately 1½ hours and maintained at 295–305° C. for approximately 6 hours. The tube and contents are allowed to cool to room temperature after which the contents are added to approximately 1000 parts of water. The highly colored insoluble precipitate is then removed from the acidic liquid by filtration, washed substantially free of acid with water, then washed with a dilute solution of sodium hydroxide to neutralize any residual acid, and finally washed again with water until substantially free of alkali. The filter cake is dried at a temperature of about 60–70° C. to give 6.9 parts of a bright red quinacridone pigment, corresponding to approximately 60% of the theoretical yield based on the quantity of dianilino-dihydro terephthalate used. On X-ray examination, the product exhibits the diffraction pattern characteristic of the gamma phase of quinacridone.

Example VIII 15 parts of diethyl-2,5-dianilino-dihydro terephthalate is oxidized and cyclized and converted to quinacridone sulfonic acid as described in the preceding example. The violet colored quinacridone sulfonic acid is then desulfonated to a beta phase quinacridone product as follows. The precipitate is mixed with 120 parts of a 20% sulfuric acid solution and the mixture is sealed in a glass-lined bomb which is then heated to approximately 300° C. during 1½ hours. The bomb and contents are maintained at this temperature for about 6 hours after which they are cooled and the contents discharged into a mixture of ice and water and worked up as described in the preceding example. A yield of approximately 7.0 parts of beta phase quinacridone is obtained.

*Example IX*

15 parts of diethyl-2,5-dianilino terephthalate is dissolved in 180 parts of concentrated sulfuric acid and the solution is heated with stirring to 150° C. during approximately 30 minutes. The solution is held at 150° C. for 15 minutes, then cooled to room temperature and 210 parts of water is added slowly with stirring. The diluted mixture is heated in a sealed thick-walled glass tube at 300° C. for 7 hours. After cooling to room temperature, the tube is opened and the contents are washed into approximately 1000 parts of water. The resulting slurry is filtered and the precipitate is washed on the filter with water, then with dilute sodium hydroxide solution, and finally washed free of alkali with water. On drying, quinacridone is obtained as a red powder.

*Example X*

4,11-dichloroquinacridone is prepared by a modification of Example I in which the 15 parts of 2,5-dianilino-terephthalic acid is replaced with 18 parts of 2,5-bis(orthochloroanilino)terephthalic acid. A yield of 16 parts of 4,11-dichloroquinacridone is obtained, corresponding to approximately 97% of the theoretical yield.

*Example XI*

2,9-dimethylquinacridone is prepared by the method of Example IV but with replacement of the 15 parts of 2,5-dianilino-terephthalic acid of Example IV with 16.2 parts of 2,5-bis(4'-methylanilino)terephthalic acid.

The minimum sulfuric acid concentration for effecting ring closure appears to be about 55% with a range of about 70-98% being preferred. However, there is no upper limit on the concentration of the sulfuric acid which may be used in this invention since the range of concentrations includes oleum. Thus, solutions of sulfur trioxide in water which contain at least about 45% by weight of $SO_3$ (approximately 55% $H_2SO_4$) are effective. Concentrations of 70% $H_2SO_4$ or more are preferred since poor yields are obtained at lower concentrations. The amount of cyclizing medium used is not critical so long as there is a sufficient amount to provide a stirrable reaction mixture.

If the desired end product is quinacridone rather than quinacridone sulfonic acid, it is preferred to use the mildest conditions possible to effect ring closure so that excessive sulfonation can be avoided. For example, if sulfonation is carried out with 96% sulfuric acid, the product obtained is more difficult to desulfonate than when the ring closure is carried out under the same conditions with 80% sulfuric acid. With the more concentrated acid, more sulfonation takes place so that increased difficulty of removal of the sulfonic acid groups is experienced. It has not been possible to effect any appreciable amount of ring closure in sulfuric acid or oleum without some sulfonation. Temperature of ring closure also influences the degree of sulfonation and difficulty in subsequent desulfonation. A minimum temperature of about 90-95° C. appears necessary for ring closure with concentrated (96%) sulfuric acid, and about 100° C. is needed for 80% sulfuric acid, but subsequent heating to about 150° C. appears necessary for optimum yield in both cases. Higher temperatures have also been used, but they are less preferred. The preferred temperature for ring closure appears to be in the range of about 140-170° C. for approximately 96% sulfuric acid (about 78% $SO_3$).

The time of heating at the reaction temperature is not critical but it is desirable to keep the time at the minimum consistent with optimum yield to avoid excessive sulfonation. The optimum time varies with rate of heating to the reaction temperature (since the reaction starts well below the 150° C. temperature at which most of it is effected) and with the temperature employed for the reaction. The preferred embodiment is for a heat-up time of approximately 20 to 30 minutes from room temperature to 150° C. and 15 minutes at 150° C. when 96% sulfuric acid is used. When oleum is used, a shorter time or a lower temperature is effective. When the dianilino-dihydro-terephthalic ester is used with oleum, the temperature rises spontaneously on addition of the terephthalic derivative and no external source of heat is required. A maximum temperature of 120° C. for a period of approximately 15 minutes is suitable in this case.

The optimum conditions for ring closure with a benzene sulfonic acid, such as para-toluene-sulfonic acid, are a temperature of about 145-150° C. for a period of ½ to 1½ hours. A higher temperature is required when a solution of para-toluenesulfonic acid in inert solvent such as trichlorobenzene or orthodichlorobenzene is used. A preferred condition is to heat the mixture at the boiling point of the para-toluenesulfonic acid solution. This is about 210° C. in the case of the trichlorobenzene solution and approximately 180° C. in the case of the solution in orthodichlorobenzene. A heating period of 3 hours or more at these temperatures has been used. In the use of the para-toluenesulfonic acid, either alone or in solution in trichlorobenzene or orthodichlorobenzene, no sulfonation takes place so excessive reaction periods are not so objectionable as in the case of sulfuric acid or oleum.

Preferred cyclizing agents for use in this invention are sulfuric acid having at least a 55% concentration, fuming sulfuric acid (oleum) and para-toluenesulfonic acid monohydrate. Other cyclizing agents include benzene sulfonic acid and benzene sulfonic acids which are substituted on the benzene ring with methyl or halogen groups, or both. Examples of such benzene sulfonic acids include xylene sulfonic acid, 4-chloro-benzene sulfonic acid, 4-bromobenzene sulfonic acid, ortho-toluene-sulfonic acid, paratoluene-sulfonic acid, and 2-chlorotoluene-4-sulfonic acid.

All of these ring closing agents are effective with either dianilino-terephthalic acids or esters, but as previously mentioned only oleum is effective in ring closing the dihydro compounds. In general, dianilino-terephthalic acid is preferred to the ester since the acid gives a smoother reaction and a better yield.

The optimum concentration of sulfuric acid for desulfonation is in the range of 20-45% $H_2SO_4$. Acid concentrations outside this range are effective to a degree but give lower yields than those in the preferred range. As noted previously, the conditions required for desulfonation vary with the conditions used for ring closure. With use of the optimum ring closure conditions, 8 hours at 250° C. gives satisfactory results in the desulfonation. In general, conditions varying from 3 hours at 300° C. to about 12 hours at 200° C. are satisfactory for desulfonation. The upper limit on the desulfonation temperature is not critical. However, one skilled in the art will recognize that it should not be so high as to cause decomposition of the quinacridone.

The crystal phase of the quinacridone product obtained is determined by the acid concentration for desulfonation and the presence or absence of seed crystals. In the absence of seed material, an acid concentration of 20-30% gives predominantly the beta phase and concentrations in the range of 40-45% give predominantly the gamma phase. The gamma phase can be obtained almost exclusively, regardless of acid concentration for desulfonation, if gamma phase seed is added to the slurry before the start of the desulfonation. Small particle size gamma phase crystals, freshly prepared by milling, are preferred for seeding. Suitable material for seeding can be prepared by milling according to the method of our U.S. Patent 2,844,581. Larger size material is less effective as seed.

In carrying out this invention, one may select the starting terephthalic acid derivative from a relatively large class of compounds. As previously pointed out, this class of compounds may be represented by the formula:

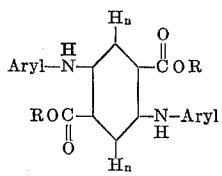

wherein *n* is from 1 to 2, R is selected from the group consisting of hydrogen and alkyl groups, and the aryl group has an unsubstituted position ortho to the amino group.

Preferred alkyl groups for R are the lower alkyls such as methyl, ethyl, propyl, and isopropyl; these are also the groups present on the aryl group when that group is alkyl-substituted. Arylamino groups which may be found in the starting diarylamino-terephthalic acid compound include those derived from such arylamines as aniline, the monohalo anilines, the dihaloanilines, the toluidines, the naphthylamines, and the like. The table given below presents a representative number of arylamines, and the starting material in which these amines are the substituents, and also the quinacridone obtained as a result of cyclizing such starting materials:

done the steps comprising cyclizing a 2,5-diarylaminoterephthalic acid compound of the formula

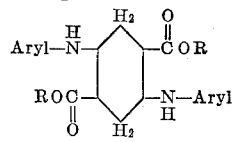

where R is an alkyl group of no more than 3 carbon atoms, and the aryl group is selected from the group consisting of phenyl, naphthyl, halogen-substituted phenyl, halogen-substituted naphthyl, alkyl-substituted phenyl and alkyl-substituted naphthyl radicals wherein said alkyl substituents contain up to 3 carbons, said substituted radicals having at least one unsubstituted carbon ortho to the amino group, by heating said terephthalic acid compound in fuming sulfuric acid.

2. The process of claim 1 wherein the 2,5-diarylaminoterephthalic acid compound is diethyl-2,5-dianilino,3,6-dihydro tertphthalate.

3. The process of claim 1 wherein the 2,5-diarylaminoterephthalic acid compound is diethyl-2,5-diorthochloroanilino-3,6-dihydro terephthalate.

4. The process of claim 1 wherein the terephthalic acid compound is diethyl - 2,5-bis(4'-fluoroanilino)-3,6-dihydroterephthalate.

TABLE

| Arylamine | Intermediate to be Cyclized | Quinacridone Compound Obtained |
|---|---|---|
| Aniline | 2,5 dianilinoterephthalic acid | Quinacridone. |
| o-Chloro-aniline | 2,5 bis(o-chloroanilino)terephthalic acid | 4,11-dichloro quinacridone. |
| p-Chloro-aniline | 2,5 bis(p-chloroanilino)terephthalic acid | 2,9-dichloro quinacridone. |
| o-Bromo-aniline | 2,5 bis(o-bromoanilino)terephthalic acid | 4,11-dibromo quinacridone. |
| p-Fluoro-aniline | 2,5 bis(p-fluoroanilino)terephthalic acid | 2,9-difluoro quinacridone. |
| 2,4-dichloro-aniline | 2,5 bis(2',4'-dichloroanilino)terephthalic acid | 2,4,9,11-tetrachloro quinacridone. |
| o-Toluidine | 2,5 bis(o-toluidino)terephthalic acid | 4,11-dimethyl quinacridone. |
| Beta naphthylamine | 2,5 bis(beta naphthylamino)terephthalic acid | 2,3,9,10-dibenzo quinacridone. |
| p-Iodo-aniline | 2,5 bis(p-iodo-anilino)terephthalic acid | 2,9-diiodo. |
| Aniline | Dimethyl 2,5-dianilino terephthalate | Quinacridone. |
| o-Chloro-aniline | Diethyl 2,5-bis(o-chloroanilino) 3,6-dihydro terephthalate | 4,11-dichloro quinacridone. |
| Aniline | Diethyl 2,5-dianilino-3,6-dihydro terephthalate | Quinacridone. |

The process of this invention offers several potential advantages over prior art processes for the manufacture of quinacridone pigments. In comparison with the boric acid fusion process, the ring closure may be carried out in a fluid mass which may be readily agitated, and it is accomplished at temperatures which do not result in any significant decomposition of the organic material. Moreover, the resulting products are of relatively high purity and are usable pigments without any additional processing. Furthermore, the process of the present invention yields the quinacridone in either the beta or gamma crystalline phase as desired, thus eliminating expensive and troublesome phase conversion steps.

Since it is obvious that many changes and modifications can be made in the above-described details without departing from the nature and spirit of the invention, it is to be understood that the invention is not to be limited to said details except as set forth in the appended claims.

I claim:

1. In a process for the production of a linear quinacri-

References Cited by the Examiner

UNITED STATES PATENTS 2,493,191  1/1950  Goldberg et al. _____ 260—279
2,821,529  1/1958  Struve _____ 260—279

FOREIGN PATENTS 1,226,260  2/1960  France.
805,247  12/1958  Great Britain.

OTHER REFERENCES

Albert: The Acridines, pages 23–4 (1951).

Fieser et al.: Organic Chemistry, 3rd ed., page 588 (1956).

Liebermann: Justus Liebig's Annalen, vol. 518, pages 245–259 (1935).

Scholl et al.: Ber. deut. Chem., vol. 44, pp. 1075–1090, p. 1079 relied on (1911).

HENRY R. JILES, *Acting Primary Examiner.*

NICHOLAS S. RIZZO, D. M. KERR, D. G. DAUS, *Assistant Examiners.*